United States Patent
Menheere

(10) Patent No.: US 11,719,101 B2
(45) Date of Patent: Aug. 8, 2023

(54) MECHANICAL DRIVE SHAFT ARRANGEMENTS FOR TAIL CONE GENERATORS

(71) Applicant: Pratt & Whitney Canada Corp., Longueuil (CA)

(72) Inventor: David Menheere, Norval (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 38 days.

(21) Appl. No.: 17/402,503

(22) Filed: Aug. 14, 2021

(65) Prior Publication Data
US 2023/0052410 A1 Feb. 16, 2023

(51) Int. Cl.
| | | |
|---|---|---|
| F02C 7/36 | (2006.01) | |
| F02C 7/32 | (2006.01) | |
| F01D 15/10 | (2006.01) | |
| F02K 3/06 | (2006.01) | |
| F01D 5/02 | (2006.01) | |

(52) U.S. Cl.
CPC ............ F01D 5/026 (2013.01); F01D 15/10 (2013.01); *F05D 2220/323* (2013.01)

(58) Field of Classification Search
CPC ..... F01D 5/026; F01D 15/10; F05D 2220/323
See application file for complete search history.

(56) References Cited

U.S. PATENT DOCUMENTS

| | | |
|---|---|---|
| 2010/0156113 A1 | 6/2010 | Lemmers, Jr. |
| 2013/0014513 A1 | 1/2013 | Barnett et al. |
| 2018/0023482 A1 | 1/2018 | Lefebvre |
| 2021/0119511 A1 | 4/2021 | Bloor |
| 2022/0298923 A1* | 9/2022 | Lighty .............. F01D 15/10 |

FOREIGN PATENT DOCUMENTS

| | | |
|---|---|---|
| EP | 3708789 A1 | 9/2020 |
| WO | WO-2016103551 A1 | 6/2016 |

OTHER PUBLICATIONS

Extended European Search Report for European Patent Application No. 21150328.9, dated May 21, 2021.
European Search Report issued in counterpart application 22190388.3 dated Jan. 17, 2023.

* cited by examiner

*Primary Examiner* — Joseph Ortega
(74) *Attorney, Agent, or Firm* — Norton Rose Fulbright Canada LLP

(57) ABSTRACT

In accordance with at least one aspect of this disclosure, there is provided a drive shaft system. In embodiments, the drive shaft system includes a generator shaft extending along a longitudinal axis with a longitudinal bore defined through the generator shaft. A thru shaft extends through the longitudinal bore of the generator shaft. In embodiments, the thru shaft includes, a front coupler mount at a first end operative to receive torque input, and a rear coupler mount at a second end opposite the first end.

13 Claims, 3 Drawing Sheets

MECHANICAL DRIVE SHAFT ARRANGEMENTS FOR TAIL CONE GENERATORS

TECHNICAL FIELD

This disclosure is generally directed to drive shafts.

BACKGROUND

In aircraft engines a generator can coupled to the engine to be driven by a spool shaft of the engine. There is always a need in the aerospace industry for improvements to drive shaft systems.

SUMMARY

In accordance with at least one aspect of this disclosure, there is provided an aircraft drive shaft system. The aircraft drive shaft system includes a generator shaft extending along a longitudinal axis with a longitudinal bore defined through the generator shaft, and a thru shaft extending through the longitudinal bore of the generator shaft. In embodiments, the thru shaft includes a front coupler mount at a first end of the thru shaft operative to receive torque input and a rear coupler mount at a second end of the thru shaft opposite the first end.

In embodiments, the generator shaft includes a rear coupler mount at a second end of the generator shaft that is coupled to the rear coupler mount of the thru shaft operative to transmit torque from the front coupler mount of the thru shaft, through the thru shaft, and into the generator shaft. In embodiments the system includes a coupling, where the rear coupler mount is indirectly operatively connected the generator shaft via the coupling. Stated differently, the rear coupler mount of the thru shaft is fastened directly to the coupling, and the rear coupler mount of the generator shaft is fastened directly to the coupling.

In certain embodiments, each of the front coupler mount and the rear coupler mount of each of the thru shaft and the generator shaft have n vertices, wherein each vertex includes a bore operative to receive a fastener. In certain such embodiments, the coupling includes 2n vertices corresponding to each vertex of each respective coupler mount. Each vertex of the coupling includes a bore operative to receive a fastener, such that the fastener extends through each respective bore of the coupling and corresponding coupler mount to fasten the respective coupler mount of the respective shaft to the coupling.

In embodiments, the aircraft drive system includes a shaft drive having a front coupler mount at a second end of the shaft drive operative to fasten to the front coupler mount of the thru shaft operative to transmit torque from the shaft drive to the generator shaft through the thru shaft. In embodiments, a front coupling is included, where the front coupler mount of the shaft drive is fastened directly to the front coupling, and wherein the front coupler mount of the thru shaft is directly fastened to the front coupling. In certain embodiments, the shaft drive includes a splined section. In embodiments, a rotor is operatively connected to the generator shaft to rotate within a generator housing to generate electrical energy.

In accordance with another aspect of this disclosure, there is provided an aircraft system. In embodiments, the aircraft system includes, a gas turbine engine having a compressor section, a turbine section, and a spool shaft operatively connecting the compressor section to be driven by the turbine section. In embodiments, the drive shaft system includes a generator shaft extending along a longitudinal axis with a longitudinal bore defined through the generator shaft, and a thru shaft extending through the longitudinal bore of the generator shaft.

In embodiments, the thru shaft includes a front coupler mount at a first end of the thru shaft operative to receive torque input and a rear coupler mount at a second end of the thru shaft opposite the first end. In embodiments, the generator shaft includes a rear coupler mount at a second end of the generator shaft that is coupled to the rear coupler mount of the thru shaft operative to transmit torque from the front coupler mount of the thru shaft, through the thru shaft, and into the generator shaft. In certain embodiments, the thru shaft is operatively connected to the spool shaft.

In embodiments, a rotor is operatively connected to the generator shaft to rotate within a generator housing to generate electrical energy and a stator is operatively connected to the generator housing radially outward of the rotor. In certain embodiments, a tail cone is included at an outlet of the turbine section, where the rotor and stator are mounted in the tail cone. In embodiments, the gas turbine engine can be selected from the group consisting of a turbojet, a turbofan, a turboprop, or a turboshaft.

In embodiments, the aircraft system further includes a coupling, where the rear coupler mount is indirectly operatively connected the generator shaft via the coupling. In other words, the rear coupler mount of the thru shaft is fastened directly to the coupling, and the rear coupler mount of the generator shaft is fastened directly to the coupling.

In certain embodiments, each of the front coupler mount and the rear coupler mount of each of the thru shaft and the generator shaft have n vertices, each vertex having a bore operative to receive a fastener. In certain such embodiments, the coupling includes 2n vertices corresponding to each vertex of each respective coupler mount. Each vertex of the coupling includes a bore operative to receive a fastener, such that the fastener extends through each respective bore of the coupling and corresponding coupler mount to fasten the respective coupler mount of the respective shaft to the coupling.

In embodiments, the spool shaft includes a front coupler mount at a second end of the spool shaft operative to fasten to the front coupler mount of the thru shaft operative to transmit torque from the spool shaft to the generator shaft through the thru shaft. In embodiments, the aircraft system further includes a front coupling, where the front coupler mount of the spool shaft is fastened directly to the front coupling, and the front coupler mount of the thru shaft is directly fastened to the front coupling.

In accordance with yet another aspect of the present disclosure, there is provided an aircraft generator system. In embodiments, the aircraft generator system includes a generator housing, a stator operatively connected to the generator housing, a generator shaft extending along a longitudinal axis of the generator housing, the generator shaft having a longitudinal bore therethrough, a rotor operatively connected to the generator shaft, and a thru shaft extending through the longitudinal bore of the generator shaft. In certain embodiments, the thru shaft is operatively connected to a spool shaft of a gas turbine engine on a first end, and the thru shaft is operatively connected to the generator shaft on a second end such that the generator is driven by the spool shaft through the thru shaft.

In certain embodiments, the generator system is integrally mounted in a tail cone of the gas turbine engine. In certain embodiments, the spool shaft is a low pressure turbine shaft of a dual spool gas turbine engine. In certain embodiments, the aircraft generator system includes a front coupling and a rear coupling, the first end of the thru shaft being indirectly operatively connected to the spool shaft via the front coupling, and the second end of the thru shaft being indirectly operatively connected to the generator shaft via the rear coupling.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
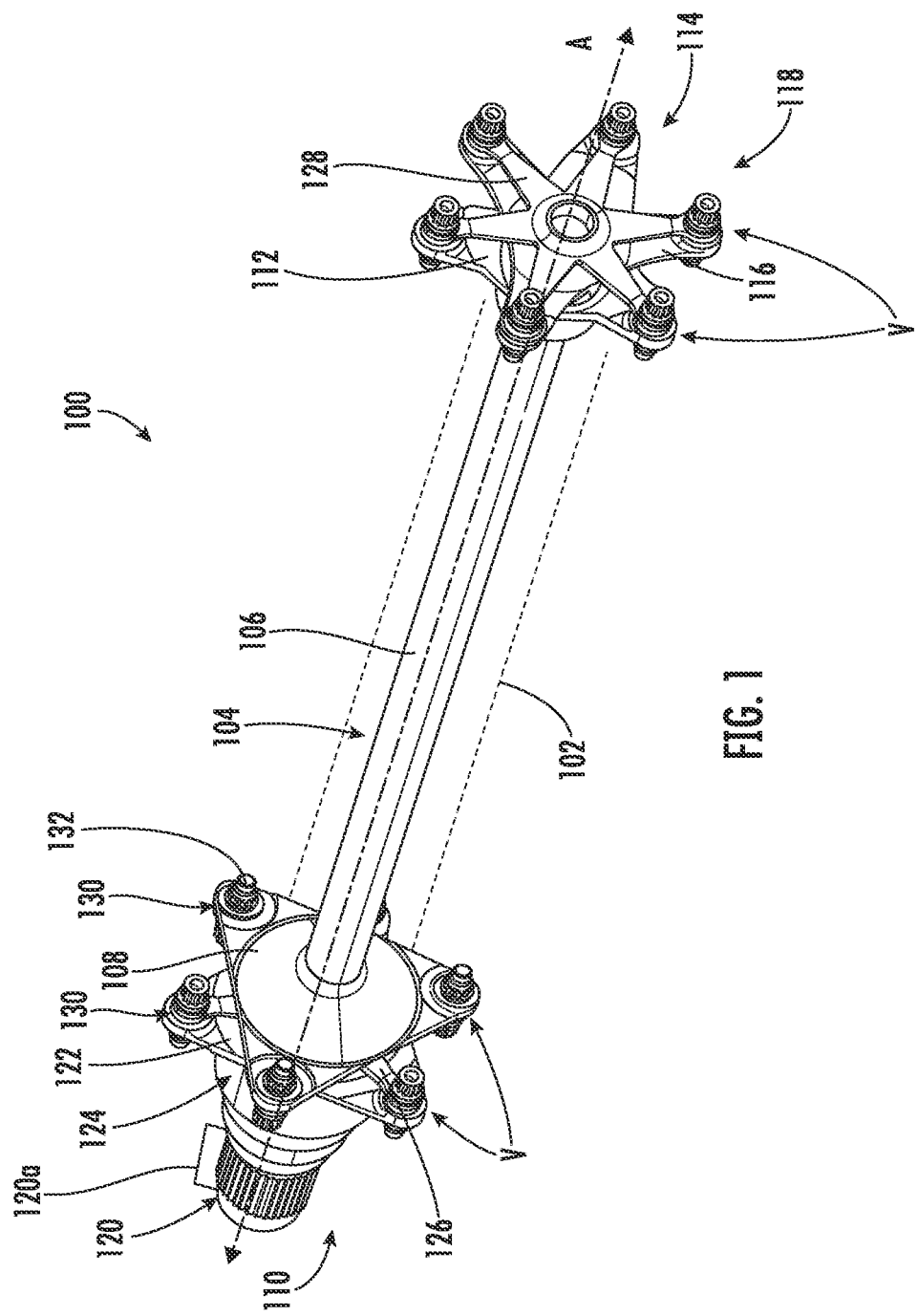
FIG. 1 is a perspective view of drive shaft system in accordance with this disclosure, showing an attachment of a thru shaft to surrounding components.
Figure 2:
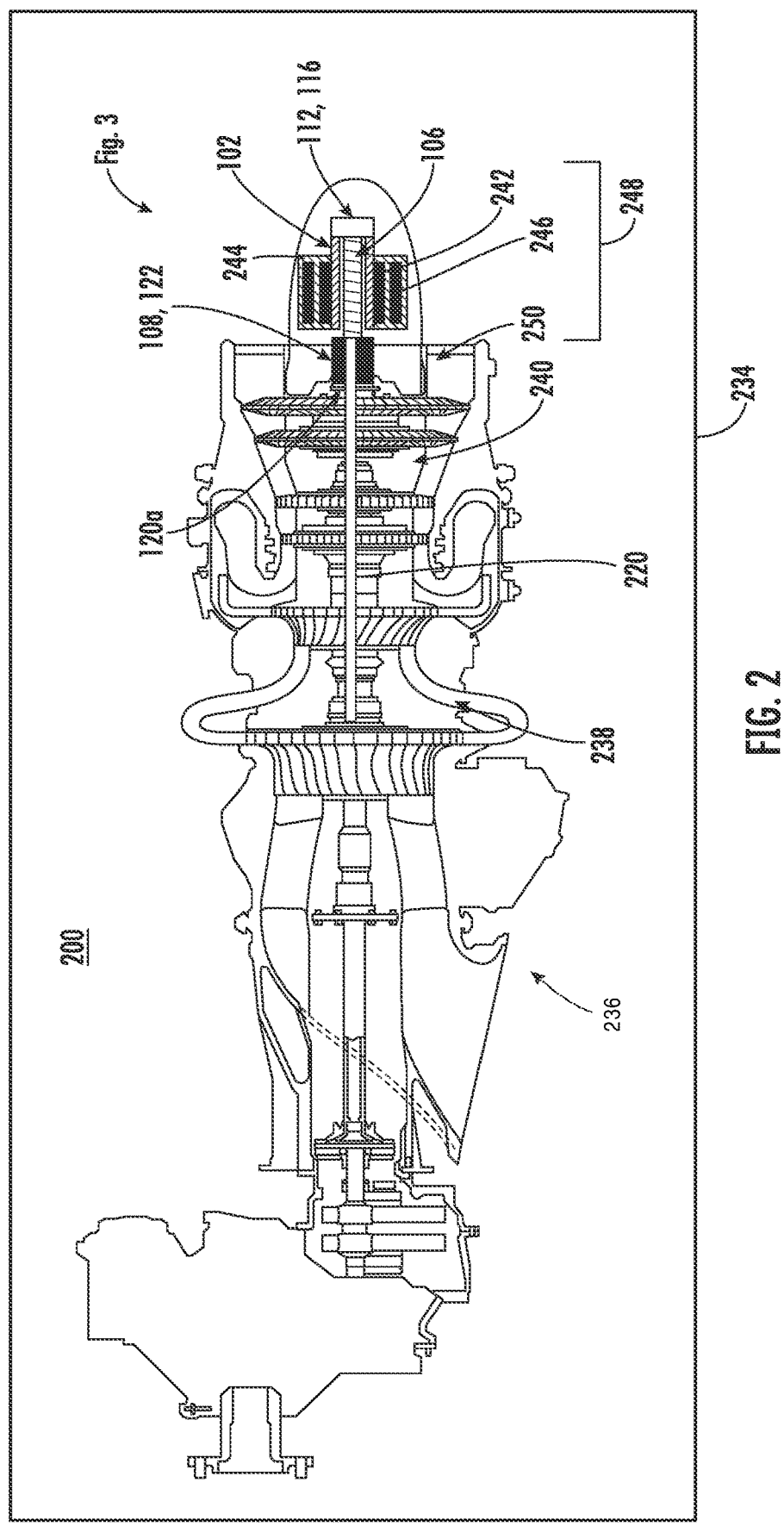
FIG. 2 is schematic cross-sectional view of an aircraft engine in accordance with this disclosure, showing the drive shaft system of FIG. 1 included in an aircraft engine.
Figure 3:
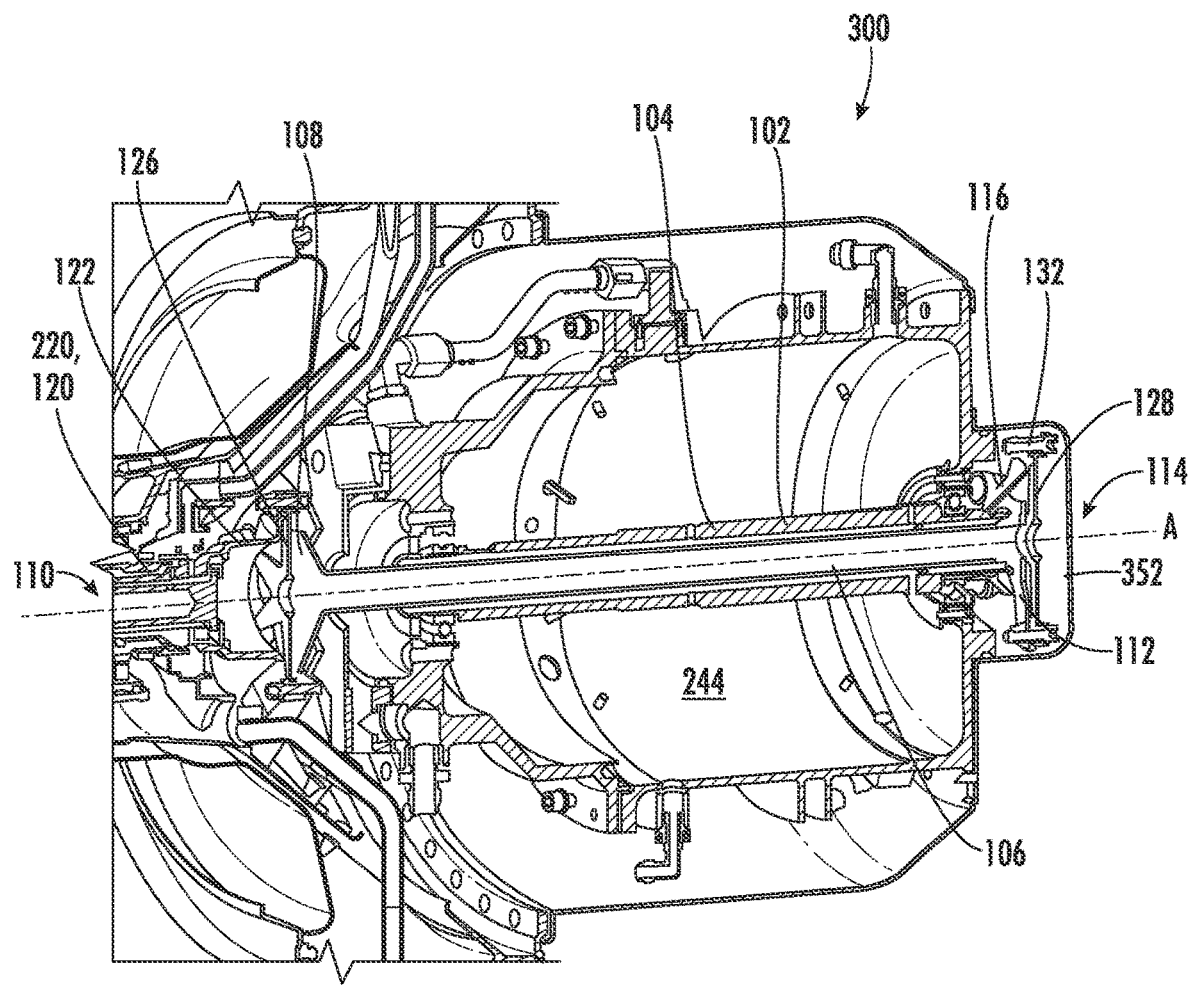
FIG. 3 is cross-sectional perspective view of an aircraft generator system in accordance with this disclosure, showing the drive shaft system of FIG. 1 included in an aircraft generator system in the aircraft engine of FIG. 2.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3. Embodiments of the systems and methods provided herein can provide improved accommodation of misalignment of generator shafts for ease of installation and operation.

In aircraft engines, a generator can coupled to the engine to be driven by a spool shaft of the engine. Deflections between the fan shaft and generator shaft may arise due to tolerances and thermal defections which can result in excessive seal wear and coupler failure. One solution is to use a plastic coupler to isolate and allow angular mismatch between the shafts as well as axial deflections, but this can result in shaft shear based on deflection. The systems and methods provided herein provide improvements to drive systems for aircraft engine generators.

Referring to FIG. 1, in accordance with at least one aspect of this disclosure, there is provided a drive shaft system 100. In embodiments, the drive shaft system 100 includes a generator shaft 102 extending along a longitudinal axis A with a longitudinal bore 104 defined through the generator shaft 102. A thru shaft 106 extends through the longitudinal bore 104 of the generator shaft 102. In embodiments, the thru shaft 106 includes, a front coupler mount 108 at a first end 110 operative to receive torque input, and a rear coupler mount 112 at a second end 114 opposite the first end 108.

The generator shaft 102 includes a rear coupler mount 116 at a second end 118 of the generator shaft configured to be coupled to the rear coupler mount 112 of the thru shaft 106 to transmit torque from the front coupler mount 108 of the thru shaft 106, through the thru shaft 16, and into the generator shaft 102. A shaft drive 120 is operatively coupled to the thru shaft 106 on the first end 110 of the thru shaft 106 via a front coupler mount 122 at a second end 124 of the shaft drive 120 to transmit torque from the shaft drive 120 to the generator shaft 102 through the thru shaft 106. The shaft drive 120 can be any suitable shaft drive, for example, the shaft drive 120 can be splined or include at least a splined section 120a.

A front end coupling 126 operatively connects the front coupler mount 122 of the shaft drive 120 to the front coupler mount 108 of the thru shaft 106. A rear end coupling 128 operatively connects the rear coupler mount 112 of the thru shaft 106 to the rear coupler mount 116 of the generator shaft 102. Each of the front coupler mounts 108, 122 and the rear coupler mounts 112, 116 are fastened directly to the respective coupling 126, 128 such that there is no direct connection between the shaft drive 120 and the thru shaft 106 or between the thru shaft 106 and the generator shaft 102.

In certain embodiments, each of the front coupler mounts 108, 122 and the rear coupler mounts 112, 116 can have n vertices (labeled V in FIG. 1), wherein each vertex V includes a bore 130 operative to receive a fastener 132. Each coupler mount can have any suitable shape and number n of vertices V, such as a triangular shape having three vertices (e.g. as shown n=3), or multiples thereof. In certain such embodiments, each coupling 126, 128 thus can include 2n vertices corresponding to each vertex V of each respective coupler mount 108, 122, 112, 116 (e.g. as shown, each coupling 126, 128 therefore includes six vertices). Each vertex of the couplings 126, 128 also includes a corresponding bore 130 operative to receive the fastener 132 to mount the respective coupler mounts 108, 122, 112, 116 to the respective coupling 126, 128. When inserted, the fastener 132 extends through each respective bore 130 of the coupling 126, 128 and corresponding coupler mount 108, 122, 112, 116 to fasten the respective coupler mount 108, 122, 112, 116 of the respective shaft 102, 106, 120 to the couplings 126, 128.

Referring now to FIG. 2, in accordance with another aspect of this disclosure, there is provided an aircraft system 200. For brevity, the description of common elements with respect to the drive system 100 that have been described above are not repeated. In certain embodiments, the drive system 100 as presented herein can be included in an aircraft 234 implementing the aircraft system 200. In certain embodiments, the aircraft 234 can include an engine 236, where the engine 236 can be a propulsive energy engine (e.g. creating thrust for the aircraft 234), or a non-propulsive energy engine. As described herein, the engine 236 is a turbofan engine, although the present disclosure may likewise be used with other engine types, for example turbojet, turboprop, or turboshaft.

In embodiments, the gas turbine engine 236 includes a compressor section 238, a turbine section 240, and a spool shaft 220 operatively connecting the compressor section 238 to be driven by the turbine section 240 and the drive shaft system 100. In the aircraft system 200, the shaft drive 120 is the spool shaft 220 of the gas turbine engine 236, such that the thru shaft 106 is operatively connected to the spool shaft 220 in any suitable manner as described herein (e.g. via coupler mounts 108, 122). In certain embodiments, the spool shaft 220 can be a low pressure turbine shaft of a dual spool gas turbine engine.

A rotor 242 is operatively connected to the generator shaft 102 to rotate within a generator housing 244 to generate electrical energy, and a stator 246 is operatively connected to the generator housing 244 radially outward of the rotor 242. In certain embodiments, a tail cone 248 is included at an outlet 250 of the turbine section 240, where the generator housing 244 and elements included therein (e.g. generator shaft 106, rotor 242, and stator 246) are mounted in the tail cone 248.

Turning now to FIG. 3, in accordance with yet another aspect of this disclosure, there is provided a generator system 300, for example for use in an aircraft engine 236. For brevity, the description of common elements with respect to the drive system 100 and aircraft system 200 that have been described above are not repeated. In certain embodiments, the drive system 100 as shown and described herein can be included in the aircraft generator system 300 (e.g. as a tail cone generator). In certain embodiments of the generator system 300, the thru shaft 106 is operatively connected to the spool shaft 220 of a gas turbine engine 236 on a first end 110, and the thru shaft 106 is operatively connected to the generator shaft 104 on a second end 114, so that the generator shaft 102 is driven by the spool shaft 220 through the thru shaft 106. It is noted that for clarity purposes, the rotor 242 and stator 246 are omitted from FIG. 3. A generator end cap 352 can be fastened to the generator housing 244 for covering the rear end coupling 128 during operation.

In accordance with another aspect of this disclosure, there is provided a method of assembling the generator system 300 into an aircraft engine (e.g. engine 236). The method includes mounting the front coupling 126 to the spool shaft 220 (e.g. via front coupler mount 122), mounting the first end 110 of the thru shaft 106 to the front coupling 126 (e.g. via front coupler mount 108), and assembling the generator housing 244 around the thru shaft 106 and spool shaft 220. The method can next include mounting the rear coupling 128 to the second end 114 of the thru shaft 106 (e.g. via rear coupler mount 112), mounting the rear coupling 128 to the second end 118 of the generator shaft 102 (e.g. via rear coupler mount 116), and mounting the rear cover 352 to the generator housing 244.

Assembly of the generator system 300 to the engine 236 in such a manner allows for improved assembly over previous systems and methods in that there is no blind assembly of a long shaft into its mating feature, for example how a typical low pressure spool shaft may be done. Without blind assembly, assembly can be made easier, assembly mistakes can be avoided, as well as damage to parts during assembly may be prevented.

In embodiments (e.g. as shown in FIGS. 1-3), by driving the generator with a thru shaft, the pivot point of the thru shaft can be moved away from the spool shaft coupler (e.g. front end coupling). Increasing the distance between the spool shaft coupler and the thru shaft pivot point can therefore reduce the influence of shaft offset and thermal deflections on the angularity between the two shafts and the amount of misalignment the coupler has to compensate for. The front and rear end couplings can also compensate for any axial movement due to thermal influence.

Embodiments can be advantageous over typical generator shafts by reducing the risk of spool shaft/generator dynamic instability, which in some instances may impact engine vibrations level and/or durability degradation of engine seals/coupling and/or the generator over time. Moreover, in embodiments, the thru shaft can also allow the generator to be moved forward (e.g. closer to the turbine section in a tail cone generator) which can reduce the overhung mass and subsequently the loading on the engine mounts and overall engine structure.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

For example, the following particular embodiments of the present technology are likewise contemplated, as described herein next by clauses.

Clause 1. An aircraft drive shaft system (1000 comprising:
a generator shaft (102) extending along a longitudinal axis (A) with a longitudinal bore (104) defined through the generator shaft;
a thru shaft (106) extending through the longitudinal bore of the generator shaft, the through shaft having:
a front coupler mount (108) at a first end (110) of the thru shaft operative to receive torque input; and
a rear coupler mount (112) at a second end (114) of the thru shaft opposite the first end, wherein the generator shaft includes a rear coupler mount (116) at a second end (118) of the generator shaft that is coupled to the rear coupler mount of the thru shaft operative to transmit torque from the front coupler mount of the thru shaft, through the thru shaft, and into the generator shaft.

Clause 2. The system as recited in clause 1, further comprising a coupling (128), wherein the rear coupler mount of the thru shaft is fastened directly to the coupling, and wherein the rear coupler mount of the generator shaft is fastened directly to the coupling.

Clause 3. The system as recited in clause 1, wherein each of the front coupler mount and the rear coupler mount of each of the thru shaft and the generator shaft have n vertices (V), wherein each vertex includes a bore (130) operative to receive a fastener (132),
wherein the coupling includes 2n vertices corresponding to each vertex of each respective coupler mount, wherein each vertex of the coupling includes a bore (130) operative to receive a fastener (132), wherein the fastener extends through each respective bore of the coupling and corresponding coupler mount to fasten the respective coupler mount of the respective shaft to the coupling.

Clause 4. The system as recited in clause 1, wherein the rear coupler mount is indirectly operatively connected the generator shaft via the coupling.

Clause 5. The system as recited in clause 1, further comprising a shaft drive (120) having a front coupler mount (122) at a second end (124) of the shaft drive operative to fasten to the front coupler mount of the thru shaft operative to transmit torque from the shaft drive to the generator shaft through the thru shaft.

Clause 6. The system as recited in clause 5, wherein the coupling is a rear coupling, and further comprising a front coupling (126), wherein the front coupler mount of the shaft drive is fastened directly to the front coupling, and wherein the front coupler mount of the thru shaft is directly fastened to the front coupling.

Clause 7. The system as recited in clause 5, wherein the shaft drive includes a splined section (120a).

Clause 8. The system as recited in clause 1, further comprising a rotor (242) operatively connected to the generator shaft to rotate within a generator housing (244) to generate electrical energy.

Clause 9. An aircraft (234) system (200) comprising:
a gas turbine engine (236) having a compressor section (238), a turbine section (240), and a spool shaft (220) operatively connecting the compressor section to be driven by the turbine section and a drive shaft system (100); the drive shaft system including:
a generator shaft (102) extending along a longitudinal axis (A) with a longitudinal bore (104) defined through the generator shaft;
a thru shaft (106) extending through the longitudinal bore of the generator shaft, the through shaft having:
a front coupler mount (108) at a first end (110) of the thru shaft operative to receive torque input; and
a rear coupler mount (112) at a second end (114) of the thru shaft opposite the first end, wherein the generator shaft includes a rear coupler mount (116) at a second end (118) of the generator shaft that is coupled to the rear coupler mount of the thru shaft operative to transmit torque from the front coupler mount of the thru shaft, through the thru shaft, and into the generator shaft, wherein the thru shaft is operatively connected to the spool shaft;
a rotor (242) operatively connected to the generator shaft to rotate within a generator housing (244) to generate electrical energy; and
a stator (246) operatively connected to the generator housing radially outward of the rotor.

Clause 10. The aircraft system as recited in clause 9, further comprising a tail cone (248) at an outlet (250) of the turbine section, wherein the rotor and stator are mounted in the tail cone.

Clause 11. The aircraft system as recited in clause 9, wherein the gas turbine engine is selected from the group consisting of: turbojet, turbofan, turboprop, or turboshaft.

Clause 12. The aircraft system as recited in clause 9, further comprising a coupling (128), wherein the rear coupler mount of the thru shaft is fastened directly to the coupling, and wherein the rear coupler mount of the generator shaft is fastened directly to the coupling.

Clause 13. The aircraft system as recited in clause 9, wherein each of the front coupler mount and the rear coupler mount of each of the thru shaft and the generator shaft have n vertices V, wherein each vertex includes a bore (130) operative to receive a fastener (132),
wherein the coupling includes 2n vertices corresponding to each vertex of each respective coupler mount, wherein each vertex of the coupling includes a bore (130) operative to receive a fastener (132), where the fastener extends through each respective bore of the coupling and corresponding coupler mount to fasten the respective coupler mount of the respective shaft to the coupling.

Clause 14. The aircraft system as recited in clause 9, wherein the rear coupler mount is indirectly operatively connected the generator shaft via the coupling.

Clause 15. The aircraft system as recited in clause 9, wherein the spool shaft includes a front coupler mount (122) at a second end (124) of the spool shaft operative to fasten to the front coupler mount of the thru shaft operative to transmit torque from the spool shaft to the generator shaft through the thru shaft.

Clause 16. The aircraft system as recited in clause 15, wherein the coupling is a rear coupling (128), and further comprising a front coupling (126), wherein the front coupler mount of the spool shaft is fastened directly to the front coupling, and wherein the front coupler mount of the thru shaft is directly fastened to the front coupling.

Clause 17. An aircraft generator system (300), comprising:
a generator housing (244);
a stator (246) operatively connected to the generator housing;
a generator shaft (102) extending along a longitudinal axis (A) of the generator housing, the generator shaft having a longitudinal bore (104) therethrough;

a rotor (244) operatively connected to the generator shaft; and a thru shaft (106) extending through the longitudinal bore of the generator shaft, wherein the thru shaft is operatively connected to a spool shaft (22) of a gas turbine engine (236) on a first end (110), and wherein the thru shaft is operatively connected to the generator shaft on a second end (114), wherein the generator is driven by the spool shaft through the thru shaft.

Clause 18. The aircraft generator system of clause 17, wherein the generator system is integrally mounted in a tail cone (248) of the gas turbine engine.

Clause 19. The aircraft generator system of clause 17, wherein the spool shaft is a low pressure turbine shaft of a dual spool gas turbine engine.

Clause 20. The aircraft generator system as recited in clause 17, further comprising a front coupling (126) and a rear coupling (128), wherein the first end of the thru shaft is indirectly operatively connected to the spool shaft via the front coupling, wherein the second end of the thru shaft is indirectly operatively connected to the generator shaft via the rear coupling.

What is claimed is:

1. An aircraft drive shaft system comprising:
   a generator shaft extending between a first end and a second end along a longitudinal axis with a longitudinal bore defined through the generator shaft, the generator shaft having a rear generator shaft coupler mount;
   a thru shaft extending through the longitudinal bore of the generator shaft, the thru shaft having:
      a front thru shaft coupler mount at a first end of the thru shaft operative to receive torque input; and
      a rear thru shaft coupler mount at a second end of the thru shaft opposite the first end,
   wherein the rear generator shaft coupler mount is coupled to the rear thru shaft coupler mount via a rear coupling operative to transmit torque from the front thru shaft coupler mount, through the thru shaft, and into the generator shaft;
   wherein each of the rear through shaft coupler mount and the rear generator shaft coupler mount has n vertices, each vertex of the n vertices including a bore, and
   wherein the rear coupling includes 2n vertices corresponding to each vertex of each respective one of the rear through shaft coupler mount and the rear generator shaft coupler mount, each vertex of the rear coupling having a bore operative to receive a fastener, the fastener extending through each respective bore of the rear coupling and a corresponding one of the bores of the respective one of the rear through shaft coupler mount and the rear generator shaft coupler mount.

2. The system as recited in claim 1, wherein the rear thru shaft coupler mount is indirectly operatively connected the generator shaft via the rear coupling.

3. The system as recited in claim 1, further comprising a shaft drive having a front coupler mount operative to fasten to the front thru shaft coupler mount to transmit torque from the shaft drive to the generator shaft through the thru shaft.

4. The system as recited in claim 3, further comprising a front coupling, wherein the front coupler mount of the shaft drive is fastened directly to the front coupling, and wherein the front thru shaft coupler mount is directly fastened to the front coupling.

5. The system as recited in claim 3, wherein the shaft drive includes a splined section.

6. The system as recited in claim 1, further comprising a rotor operatively connected to the generator shaft to rotate within a generator housing to generate electrical energy.

7. An aircraft system comprising:
   a gas turbine engine having a compressor section, a turbine section, and a spool shaft operatively connecting the compressor section to be driven by the turbine section;
   a drive shaft system including:
      a generator shaft extending between a first end and a second end along a longitudinal axis with a longitudinal bore defined through the generator shaft;
      a thru shaft extending through the longitudinal bore of the generator shaft, the thru shaft having:
         a front thru shaft coupler mount at a first end of the thru shaft operative to receive torque input; and
         a rear thru shaft coupler mount at a second end of the thru shaft opposite the first end, wherein the generator shaft includes a rear generator shaft coupler mount at the second end of the generator shaft that is coupled to the rear thru shaft coupler mount operative to transmit torque from the front thru shaft coupler mount, through the thru shaft, and into the generator shaft, wherein the thru shaft is operatively connected to the spool shaft;
   a rotor operatively connected to the generator shaft to rotate within a generator housing to generate electrical energy;
   a stator operatively connected to the generator housing radially outward of the rotor; and
   a tail cone at an outlet of the turbine section, wherein the rotor and stator are mounted in the tail cone.

8. The aircraft system as recited in claim 7, wherein the gas turbine engine is selected from the group consisting of: turbojet, turbofan, turboprop, or turboshaft.

9. The aircraft system as recited in claim 7, further comprising a coupling, wherein the rear thru shaft coupler mount of the thru shaft is fastened directly to the coupling, and wherein the rear generator shaft coupler mount is fastened directly to the coupling.

10. The aircraft system as recited in claim 9, wherein each of the rear thru shaft coupler mount and the rear generator shaft coupler mount has n vertices, wherein each vertex of the n vertices includes a bore,
    wherein the coupling includes 2n vertices corresponding to each vertex of each respective one of the rear thru shaft coupler mount and the rear generator shaft coupler mount, wherein each vertex of the coupling includes a bore operative to receive a fastener, where the fastener extends through each respective bore of the coupling and a corresponding one of the bores of the respective one of the rear through shaft coupler mount and the rear generator shaft coupler mount.

11. The system as recited in claim 7, wherein the rear thru shaft coupler mount is indirectly operatively connected the generator shaft via a coupling.

12. The system as recited in claim 7, wherein the spool shaft includes a front coupler mount operative to fasten to the front thru shaft coupler mount of the thru shaft operative to transmit torque from the spool shaft to the generator shaft through the thru shaft.

13. The system as recited in claim 12, wherein the coupling is a rear coupling, and further comprising a front coupling, wherein the front coupler mount of the spool shaft is fastened directly to the front coupling, and wherein the front thru shaft coupler mount is directly fastened to the front coupling.

\* \* \* \* \*